United States Patent
Lang

[11] 3,734,533
[45] May 22, 1973

[54] MOTOR VEHICLE SAFETY DEVICE

[76] Inventor: Franz Lang, 31 Simmonds Street, Johannesburg, Transvaal Province, South Africa

[22] Filed: Apr. 9, 1971

[21] Appl. No.: 132,652

[30] Foreign Application Priority Data

Apr. 23, 1970 South Africa ................ 700886

[52] U.S. Cl. ............................................. 280/150 B
[51] Int. Cl. ............................................. B60r 21/02
[58] Field of Search .................. 280/150 B, 150 R; 180/82

[56] References Cited

UNITED STATES PATENTS

| 3,133,746 | 5/1964 | Zazzara | 280/150 B |
| 2,661,221 | 12/1953 | Lockwood | 280/150 B |
| 3,630,542 | 12/1971 | Wycech | 280/150 B |

Primary Examiner—Leo Friaglia
Assistant Examiner—Robert R. Song
Attorney—Shlesinger, Arkwright & Garvey

[57] ABSTRACT

A motor vehicle having seats therein and a ceiling over the seats and including a safety device comprising a transverse elongated member mounted on supports therefor and adapted to move downwards in front of occupants of a seat in the motor vehicle, the elongated member being releasably held adjacent the ceiling of the vehicle by means of a latch adapted to release the elongated member during abnormally fast decelerations of the vehicle to prevent persons in the car from falling forwardly beyond the elongated member.

13 Claims, 5 Drawing Figures

PATENTED MAY 22 1973  3,734,533

MOTOR VEHICLE SAFETY DEVICE

This invention relates to a passenger safety device in a motor vehicle and more particularly to safety devices adapted to protect its occupants from serious injuries in the event of a collision or sudden and severe changes in speed of the vehicle.

Whereas up to now safety belts have been fitted to a wide range of motor vehicles they serve their purpose only when used. Often occupants sustain heavy, sometimes fatal, injuries due to the improper or lack of use of these safety belts. In some cases, after an accident, it has been found necessary to cut the safety belt to free the injured. Furthermore, in the case of fire or other imminent danger the occupant is restricted to the seat by the belt, which some passengers find difficult to unbuckle quickly enough. The present invention provides for the protection of the occupants of a vehicle at all times, avoids restriction of movement and becomes operative during collisions or sudden heavy decelerations. There need be no direct contact between an occupant and the device under normal driving conditions, as compared with a safety belt.

The object of this invention is to provide a device which will prevent serious or fatal injury to the occupants of a motor vehicle and obviate at least some of the above-described disadvantages of a safety belt.

According to this invention there is provided a motor vehicle safety device comprising a transverse elongated member mounted on supports therefor and adapted to move downwards in front of occupants of a seat in a motor vehicle, the elongated member being releasably held against the ceiling by means of a latch adapted to release the elongated member during abnormally fast deceleration of the vehicle.

Further features of this invention provide for the elongated member to be in the form of a bar, for the bar to be resilient and/or deformable, and to be attached to supporting arms, which in turn, are pivoted to the roof or roof supporting columns behind and above the seat with which the bar is associated.

The invention further provides for an arrester-mechanism to be provided for the safety device to arrest the motion of the bar in a desired position after release thereof, and for the arrester-mechanism to comprise a stop associated with one support arm and a ratched and pawl associated with the other support arm of the bar.

The invention further provides for a safety device as above defined to be fitted for both the front and the rear seats of a conventional passenger motor vehicle and also for two independant bars to be provided for the front seats of a motor vehicle, one for the driver and one for any other occupants of a front seat.

A preferred embodiment of this invention is illustrated in the accompanying drawings in which.

Figure 1:
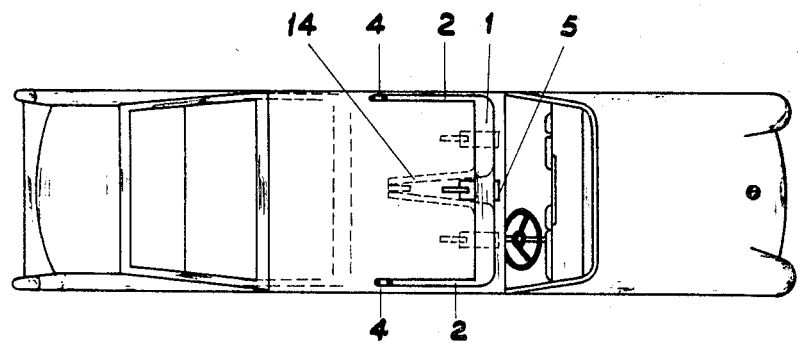
FIG. 1 is the plan view of the safety device installed in a motor vehicle.
Figure 2:
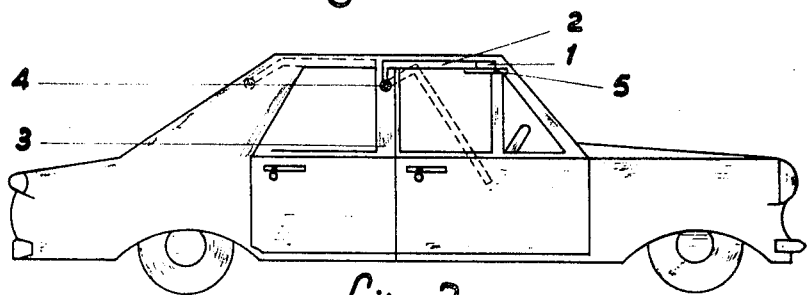
FIG. 2 is the elevation thereof.
Figure 5:
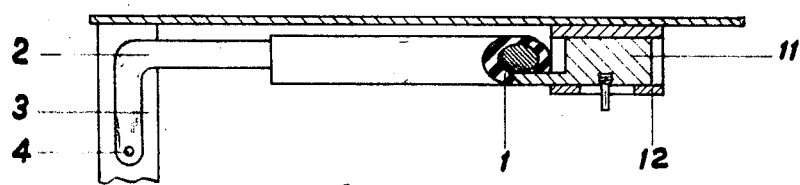
FIG. 5 is a cross-section of the bar and latch assembly.

In this embodiment of the invention the safety device comprises a heavily padded transverse bar 1 extending substantially across the entire width of a motor vehicle, the bar being attached at each end to one end of a supporting arm 2 which has its other end pivotally secured to the door post 3 as indicated by numeral 4 in FIGS. 1, 2 and 5.

The bar 1 is releasably supported adjacent the ceiling of the passenger cab by means of a latch 5 and with the bar in this position the arms 2 extend rearwardly flush with the ceiling and then downwardly at substantially a right angle towards the pivot point 4.

The latch 5 preferably comprises a bolt 11 which engages the bar 1 and which is slidable in a mounting 12 therefor in a direction parallel to the length of the vehicle. This latch 5 is arranged such that upon abnormal deceleration of the vehicle the momentum of the bolt carries it forward to release the bar.

Figure 3:
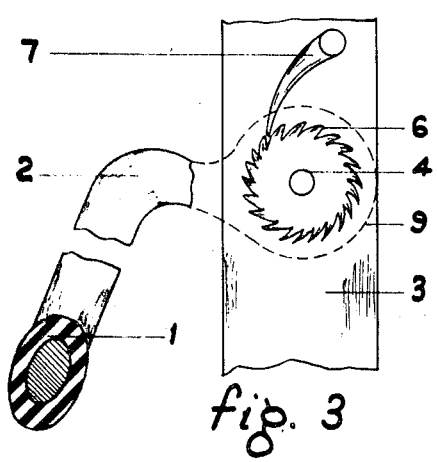
FIG. 3 is an elevation of part of the arrester-mechanism showing a ratchet and a pawl with the bar in a lowered position.
Figure 4:
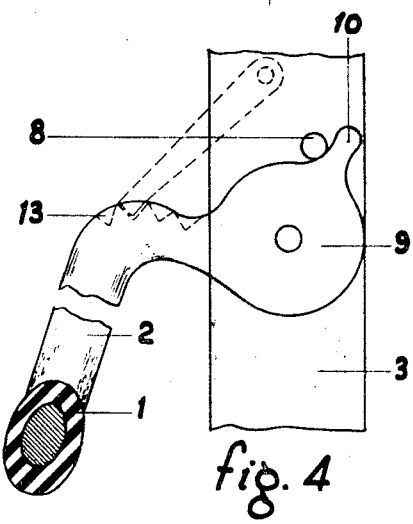
FIG. 4 is an elevation of the other part of the arrester-mechanism showing the stop.

An arrester-mechanism is also provided for the bar to arrest the motion thereof in a desired position as shown in FIG. 3 and 4 after the bar has been released from its raised position. FIG. 3 shows a ratchet 6 and a pawl 7 associated with one support arm 2 whereas FIG. 4 shows a stop 8 associated with the other support arm 2. This stop may be adjustable in position to ensure that the bar may be arrested away from the persons chest regardless of the size thereof.

As shown in FIG. 3, the arrester mechanism comprises a ratchet wheel 6 mounted between the door post 3 and the pivoted end 9 of the support arm 2. The ratchet wheel 6 is mounted in such a manner that there is no relative movement between the pivoted end 9 of the support arm 2 and the wheel itself, but together they move relative to the door post 3. A pawl 7 is pivotally suspended on the door post above the ratchet wheel 6 and therefore the bar 1 in one direction only. It will be understood that this ratchet assembly must be suitably shielded to prevent injury to persons thereby. For this reason it may be preferable to use the alternate arrester mechanism described below.

On the pivoted end 9 of the other support arm 2 (as shown in FIG. 4), a stop 8, in the form of a lug, is rigidly mounted on the door post 3 adjacent and above the pivoted end 9. The latter is provided with a formation 10 to engage the stop 8.

In use therefore with the bar supported by the latch, any abnormal deceleration of the motor vehicle such as may occur on impact in a collision or upon heavy braking in an emergency will cause the latch to be instantly released and the bar will fall downwardly in front of the occupants of the seat with which the bar is associated. The arrangement is such that with the bar in this downward position it is level with the chest of an occupant of the seat (as shown in dotted lines in FIG. 2) thereby preventing such person from being flung forwardly onto the dashboard of the vehicle or through the windscreen thereof.

The stop 8 is arranged so that the bar will not be able to actually strike the chest of an occupant but will be stopped a short distance from the person's chest. The ratchet assembly on the other hand prevents the bar from rising after it has fallen thereby preventing, for example, the bar rebounding to a position opposite a person's face thus obviating the possibility of facial or neck injuries caused by impact with the bar.

The speed with which the bar falls in front of persons in the seat is increased due to the shape of the supporting arms 2 which, because of the substantially right angled bend therein give rise to a moment of force on the arms which tends to accelerate the bar downwardly in an arc upon deceleration of the vehicle. Thus the speed of falling of the bar and the sensitivity of the device may be altered according to requirements by suitably designing the latch, lengths of the portions of arms and weight of the bar.

With correct design the bar will fall in front of the occupants of a car instantly and before they get thrown forwardly.

It will be understood that many variations may be made to the above-described examples without departing from the scope of the invention. For example, any type of latch adapted to release upon deceleration of the vehicle may be used and the shape and structure of the arms and bar varied according to requirements. Also, individual bars may be provided for each occupant or for each of a number of bucket seats in a motor vehicle. The latter is of particular importance in the case of the front seats of a motor vehicle wherein the driver of the vehicle would be provided with a separate bar as indicated by dotted lines 14 in FIG. 1.

Furthermore, instead of a ratchet wheel being used, the arcuate edge 13 of the pivoted end of the support arm can be shaped to form a ratchet as illustrated in dotted lines in FIG. 4, this arrangement being less inclined to injure persons than the conventional ratchet wheel above described.

It will therefore be appreciated that the invention provides a useful and effective safety device, the efficiency of which will depend largely upon the design thereof. It will of course be understood that the bar can be left in a lowered position in front of persons sitting in the vehicle during normal driving, for example, where children are the occupants concerned.

What I claim as new and desire to secure by letters patent is:

1. A motor vehicle having seats therein and a vehicle body surrounding the seats and including a safety device comprising:
   a. a transverse elongated member,
   b. supporting arms connected to said elongated member,
   c. said supporting arms being pivotally engaged at the free ends thereof with the vehicle body above one of the seats and extending forwardly from said pivotal engagement, said supporting arms being bent along their length, whereby, when in an inoperative position above one of the seats, the major portion of the device lies above the point of pivotal engagement of said supporting arms with the vehicle body, and
   d. means for releasably holding said elongated member in said inoperative position,
   e. said means including a housing fixed to the vehicle body,
   f. a member positioned in said housing normally engaged with said elongated member,
   g. said member being slideable in a direction parallel to the length of the vehicle whereby, upon abnormal deceleration of the vehicle, said member slides out of engagement with said elongated member to release the latter, thereby permitting said elongated member to gravitate to the operative position in front of the passenger.

2. A safety device for a motor vehicle as set out in claim 1 wherein:
   a. said means releasably holding said elongated member comprises a latch,
   b. said latch including a mounting fixed to said vehicle, and
   c. a bolt in sliding frictional engagement with said mounting.

3. A safety device for a motor vehicle as set out in claim 1 wherein:
   a. said transverse elongated member is cushioned.

4. A safety device for a motor vehicle as set out in claim 1 with the addition of:
   a. arresting means for halting the motion of said elongated member in a desired position after the release thereof.

5. A safety device for a motor vehicle as set out in claim 4 wherein:
   a. said arresting means comprises a stop fixed to said vehicle body, and
   b. a member carried by one of said supporting arms and engageable with said stop for limiting the downward motion of said elongated member.

6. A safety device for a motor vehicle as set out in claim 4 wherein:
   a. said arresting means comprises a ratchet assembly associated with one of said support arms,
   b. said ratchet assembly is adapted to allow only downward movement of said elongated member, and
   c. said ratchet assembly being disengageable from said supporting arm to allow for resetting thereof.

7. A safety device for a motor vehicle as set out in claim 1 wherein:
   a. the vehicle is provided with front and rear seats and said safety device is fitted for both the front and rear seats of the motor vehicle.

8. A safety device for a motor vehicle as set out in claim 1 wherein:
   a. a separate elongated member is provided for the driver of the vehicle.

9. A safety device for a motor vehicle as set out in claim 1 wherein:
   a. said elongated member is in the form of a bar.

10. A motor vehicle having seats therein and a vehicle body surrounding the seats and including:
    a. a transverse elongated member,
    b. supporting arms connected at one end to the ends of said elongated member,
    c. said supporting arms being bent along their length and the free ends thereof being pivotally engaged with the vehicle body in a manner to place the major portion of the device above the point of pivotal engagement of said device with the vehicle body, said supporting arms extending forwardly from said pivotal engagement, and
    d. a latch for releasably holding said elongated member and supporting arms in an inoperative position above one of the seats,
    e. said latch including a mounting fixed to the vehicle body, and
    f. a bolt in frictional engagement with said mounting and normally engaged with said elongated member,
    g. said bolt being slideable in said mounting in a direction parallel to the length of the vehicle whereby, upon abnormal deceleration of the vehicle, said bolt slides out of engagement with said elongated member to release the latter, thereby permitting said elongated member to gravitate to the operative position in front of the passenger.

11. A safety device for a motor vehicle as set out in claim 10 with the addition of:
   a. arresting means for halting the motion of said elongated member in a desired position after the release thereof.

12. A safety device for a motor vehicle as set out in claim 11 wherein:
   a. said arresting means comprises a stop fixed to said vehicle body, and
   b. a member carried by one of said supporting arms and engageable with said stop for limiting the downward motion of said elongated member.

13. A safety device for a motor vehicle as set out in claim 11 wherein:
   a. said arresting means comprises a ratchet assembly associated with one of said supporting arms, and
   b. said ratchet assembly is adapted to allow only downward movement of said elongated member,
   c. said ratchet assembly being disengageable from said supportin arm to allow for resetting thereof.

* * * * *